United States Patent [19]

Koehn

[11] Patent Number: 5,351,898
[45] Date of Patent: Oct. 4, 1994

[54] APPARATUS AND METHOD FOR ALLOWING A PILOT TO SEE OUTSIDE AN AIRPLANE

[75] Inventor: Michael S. Koehn, Bellevue, Wash.

[73] Assignee: The Boeing Company, Seattle, Wash.

[21] Appl. No.: 988,563

[22] Filed: Dec. 10, 1992

[51] Int. Cl.[5] .............................................. B64C 1/28
[52] U.S. Cl. ................................ 244/118.5; 244/129.3
[58] Field of Search ................... 244/129.3, 118.5, 121, 244/46, 120

[56] References Cited

U.S. PATENT DOCUMENTS

| | | | |
|---|---|---|---|
| 2,201,249 | 5/1940 | Tormollan, Jr. | 244/121 |
| 3,489,375 | 1/1970 | Tracy | 244/46 |
| 3,572,615 | 3/1971 | Firestone | 244/129.3 |
| 3,690,600 | 9/1972 | Cooper | 244/120 |

FOREIGN PATENT DOCUMENTS 3629838  1/1988  Fed. Rep. of Germany ... 244/129.3

*Primary Examiner*—Galen L. Barefoot
*Attorney, Agent, or Firm*—Robert H. Sproule

[57] ABSTRACT

An airplane, such as a supersonic airplane, includes at least one viewing tunnel located behind the cockpit instrument panel for allowing the pilot to see in front of and to the side of the airplane during low speed flight. The viewing tunnel is especially useful during landing approaches and touchdown when the airplane's high angle of attack and long nose prevents the pilot from seeing the landing environment through the conventional forward cockpit windows. The viewing tunnel allows the pilot to see through a large opening in the bottom and sides of the airplane. This opening is covered by canards during high speed flight and uncovered during low speed flight when the canards are moved to the extended position to provide additional control authority for the airplane.

9 Claims, 4 Drawing Sheets

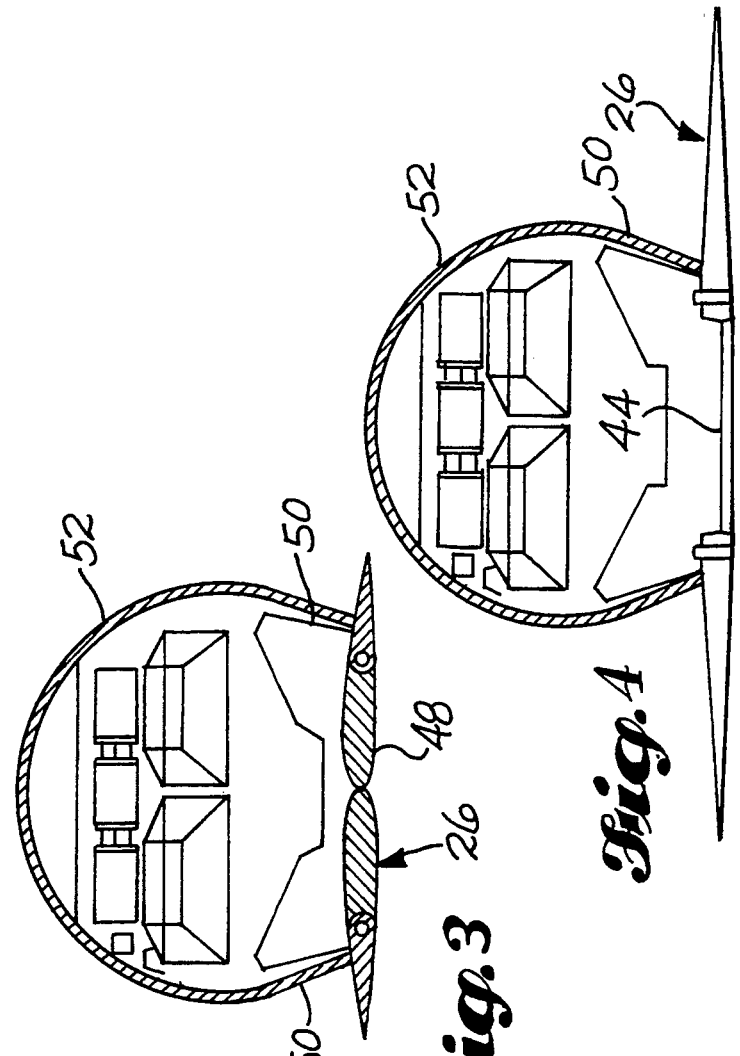

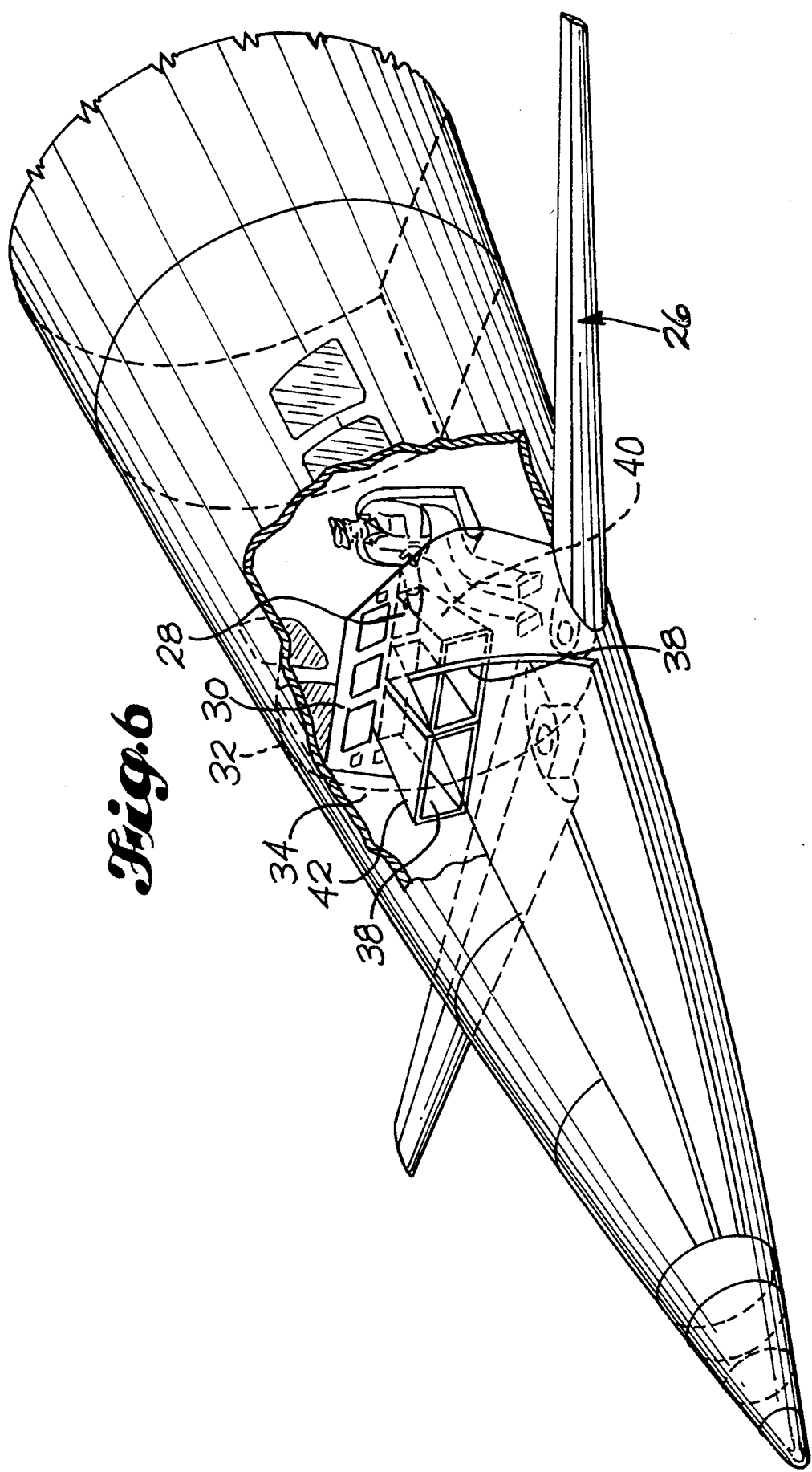

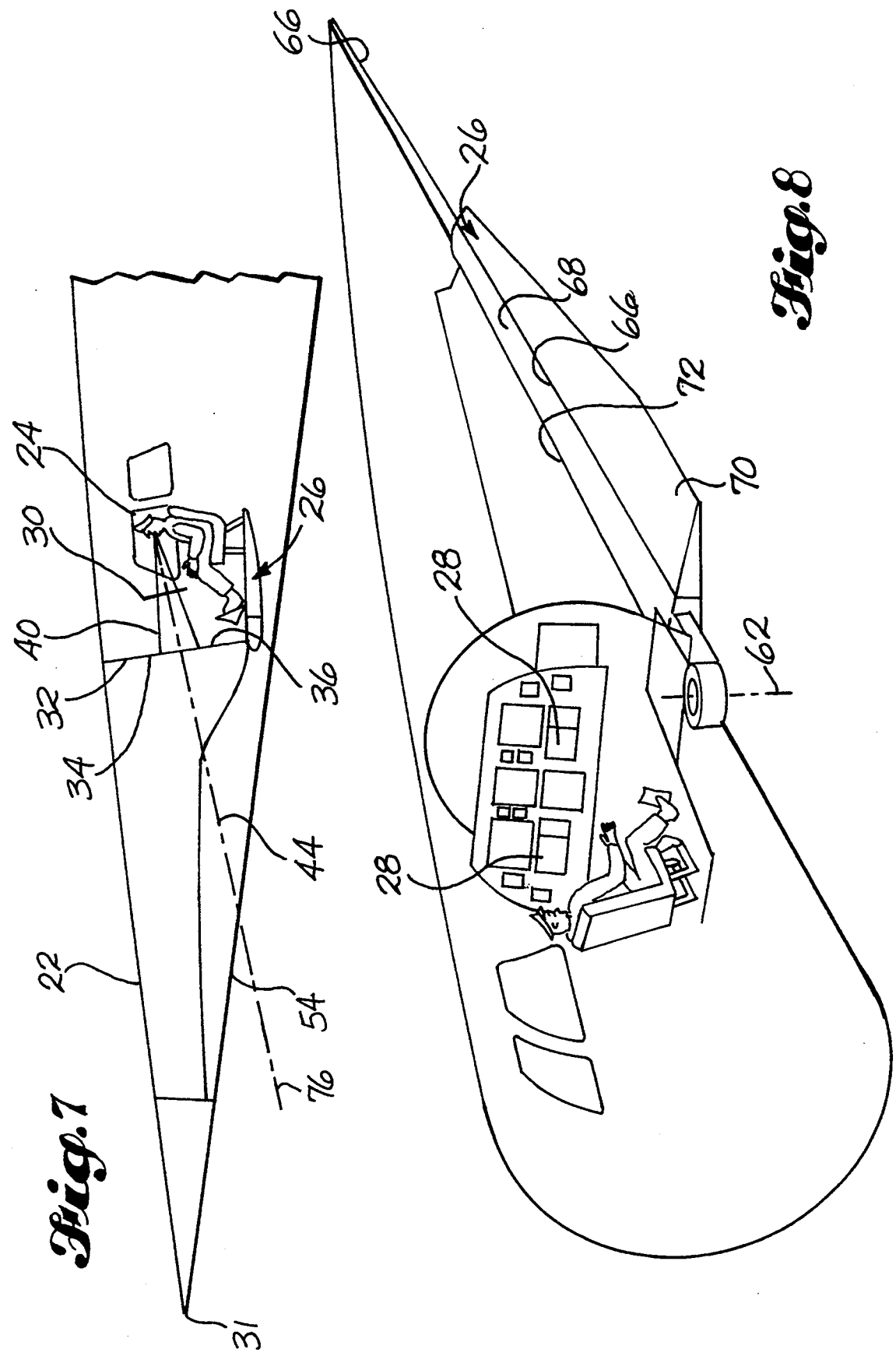

APPARATUS AND METHOD FOR ALLOWING A PILOT TO SEE OUTSIDE AN AIRPLANE

TECHNICAL FIELD

The present invention pertains to apparatus and methods for allowing a pilot to see outside an airplane, particularly during a landing approach.

BACKGROUND OF THE INVENTION

As new airplanes are being developed, it is becoming more of a challenge to enable the pilot to see outside the airplane during critical phases of flight. For example, some conventional supersonic transport airplanes, such as the Concorde, have a system for lowering the nose during landing approach to allow the pilots to see the approach and runway environment during this phase of the flight. If the nose were not lowered, the airplane's long nose in front of the pilot and the fact that the airplane is at a high angle of attack during landing, would prevent the pilots from looking over the nose and seeing the runway.

Furthermore, it is believed that some future airplanes will employ what is known as "synthetic vision". One form of synthetic vision may be a digital display which is provided to the pilots to represent the external environment under selected weather conditions. The digital display could involve a flight deck display screen interfaced with a digital data base. Any images provided to the screen would originate in the data base. Aircraft sensor data might be overlayed as data base imagery or some component of the sensor data could be conditioned and blended with data base imagery. Thus synthetic vision as well as other future vision systems might allow removal of the cockpit/flight deck forward windows in order to reduce weight and eliminate the cockpit/flight deck external skin bulge thereby reducing drag.

In certain aircraft it may be desirable not to have a nose which must be lowered to allow the pilot's to see the landing environment. In addition, it may be desirable to provide a method of allowing the pilots to directly see the runway during approach and landing without having to rely solely on a form of artificial vision.

A number of conventional devices for looking out of an aircraft have been disclosed. For example, U.S. Pat. No. 1,045,152 by Kelsey discloses an airplane having a window in the bottom of the fuselage to allow the pilot to see out the bottom of the airplane. In addition, U.S. Pat. Nos. 4,264,044 and 4,160,534 by White, and assigned to the assignee of the present invention, disclose an operating station for an airplane refueling boom which includes a window for permitting a boom operator to view the boom.

SUMMARY OF THE INVENTION

The present invention pertains to an airplane having an aperature located in an instrument panel of the airplane's cockpit. A nose portion of the airplane has an opening behind the aperature to permit a pilot in the cockpit to look through the instrument panel aperature and nose opening to see the approach and landing environment. In addition, the airplane has a door which is connected to the aircraft and which is movable between (i) an open position where the opening is not covered and (ii) a closed position where the opening is covered and the door is aligned with an exterior surface of the nose portion.

BRIEF DESCRIPTION OF THE DRAWINGS

These and other features of the present invention will be described in the following Detailed Description in conjunction with the attached drawings, in which:

FIG. 1 is a side view of a supersonic airplane during approach to a runway;

FIG. 2 is cross sectional view of a nose portion of the airplane looking aft and showing the canards in the stowed position;

FIG. 3 is a cross sectional view of the nose portion of the airplane looking aft and showing the canards in a partially extended position;

FIG. 4 is a cross sectional view of the nose portion of the airplane looking aft and showing the canards in a fully extended position;

FIG. 6 is a partial cutaway isometric view of the nose portion showing the carnards in the extended position;

FIG. 7 is a side view of the nose portion with the canards in the extended position; and FIG. 8 is a partial cutaway isometric view of the nose portion showing the canards in a partially stowed position.

DETAILED DESCRIPTION

Figure 5:
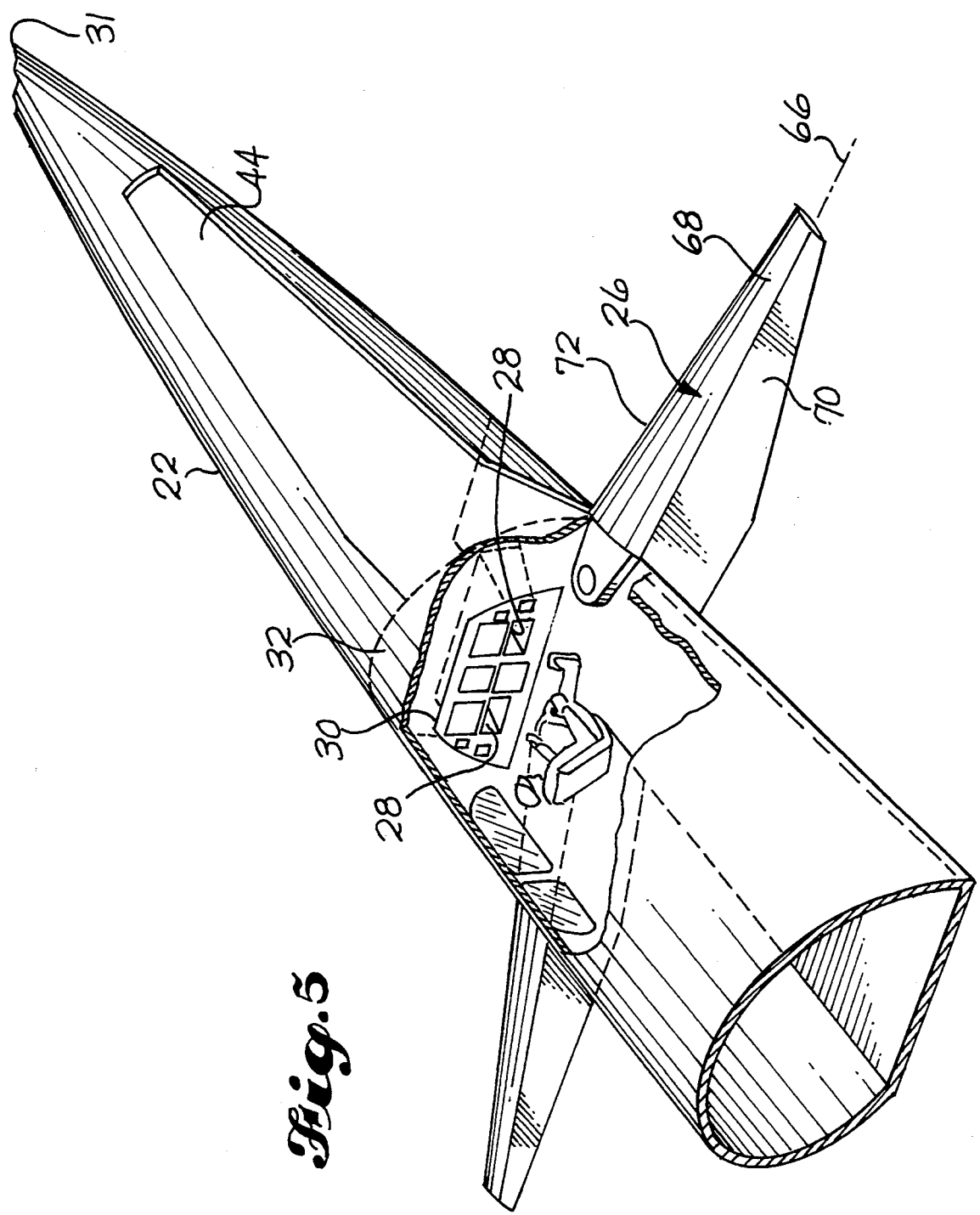
FIG. 5 is a partial cutaway isometric view of the nose portion looking forward from a location behind and above the cockpit.

In an exemplary embodiment, the present invention will be described for use on a supersonic passenger airplane. However, it should be appreciated that the present invention may be used on both subsonic airplanes, supersonic airplanes and airborne space vehicles.

Referring first to FIG. 1, there is shown a supersonic airplane indicated at 20 in a landing attitude about one hundred feet above a runway. The airplane 20 includes a nose portion 22 and side cockpit windows 24. Located aft of the windows 24 along either side of the fuselage are canards indicated at 26. When the airplane is traveling at slow speeds the canards are moved from a stowed position where the canards are flush with the fuselage nose portion as shown in FIG. 2 to the extended position shown in FIGS. 3, 4 and 5. The canards 26 provide additional control authority which is necessary to maneuver the airplane during slow speed flight. Prior to high speed flight, the canards are placed in the stowed position shown in FIG. 2.

During landing approach it is very difficult for the pilots to see over the nose through the cockpit windows 24 due both to the length of the nose (which may be over thirty feet in front of the pilot) and the large nose-up angle of the airplane. In order to allow the pilots to see directly in front of and below them to view the landing environment, there are a pair of left, right viewing aperatures 28 (FIG. 5) in a cockpit instrument panel 30. Located behind (toward a nose tip 31 of the airplane) the aperatures 28 is a bulkhead 32 (FIG. 5) which acts as a pressure wall having an outer surface 34 (FIG. 7) which is exposed to atmospheric pressure and an inner surface 36 which is exposed to cabin pressure. The pressure bulkhead 32 includes a pair of left, right transparent windows 38 (FIE. 6) which are located directly behind (along the aircraft approach velocity vector) the instrument panel aperatures 28 at a distance of about 18 inches. In an exemplary embodiment, a viewing tunnel 40 is formed by a rectangular shroud 42 which extends in a fore and aft direction between the outer edges of each instrument panel aperature 28 and the associated pressure bulkhead window 38. By extending the canards 24, a large opening 44 (FIG. 5) is exposed in the bottom and sides of the airplane fuselage which allow the pilots to look through their respective viewing tunnels 40 and the opening 44 to the runway environment.

More specifically, the nose portion 22 has a somewhat conical shape except that the lower one third of the nose portion is defined by a flat bottom 48 (FIG. 3) and flat right and left sides 50 of the airplane. The cross-section of the nose portion 22 shows the flat bottom 48 joined to diverging right, left sides 50 which extend outwardly and upwardly a short distance and which are joined to a curved top portion 52 of the airplane. Furthermore, the opening 44 (FIG. 7) extends from a location slightly forward of the cockpit in a forward direction to a location aft of the tip of the nose. When looking at the nose portion in cross section (FIG. 4), the opening 44 extends approximately between the four o'clock position and the eight o'clock position. Additional support for the nose is provided by a keel beam 54 (FIG. 7) which extends in a fore and aft direction across the opening 44 along the bottom of the airplane.

Prior to high speed flight it is essential that the opening 44 be covered in order to minimize drag. This is accomplished by the canards 26 which are connected to the airplane in a conventional manner along a vertical hinge axis shown by a line designated by a number 62 (FIG. 8). To place the canards in the stowed position from the extended position, they are rotated forward about the hinge axis 62 from a location where their spanwise axis is generally perpendicular to the longitudinal axis of the aircraft as shown in FIG. 5, to the partially stowed position where their longitudinal axis is generally parallel to the surface of the nose portion 22 as shown in FIG. 8.

As shown in FIG. 5, each canard includes a forward spanwise portion 68 and a rearward spanwise moving control surface 70. When the canard is moved to the partially stowed position it is pivoted about the hinge axis 62 (FIG. 8) until a leading edge 72 of the canard is moved to a location parallel to and adjacent the keel beam 54 and so that (as shown in FIGS. 3 and 8) the canard forward portion 68 covers the bottom of the opening 44 in a manner aligned with the bottom 48 of the nose portion. Following this, the canard rear portion 70 is caused to pivot vertically about axis 66 so that the rear portion 70 of the canard covers the side of the opening 44 in a manner aligned with the remainder of the nose portion side 50 as shown in FIG. 2. In this manner, the opening 44 is sealed by the canards 26 so as to provide a smooth continuous aerodynamic surface. In the present invention, the canards are operated by conventional systems which are not part of the present invention.

As shown in FIG. 7, when the canards 26 are in the extended position, the pilot can see directly through the vision tunnel 40 along and below the airplane's approach/landing velocity vector designated by a line 76. The pilot can see through the bottom of the nose portion as well as through the sides of the nose portion allowing him to have a clear view of the runway environment.

The dimensions of each instrument panel aperature 28, pressure bulkhead transparent window 38, and the fuselage opening 44 are a function of the pilot's vision requirements during the landing approach and touch-down. SAE Aerospace Standards AS 580B "Pilot Visibility From the Flight Deck" state that landing vision "view angle forward and down shall be sufficient to allow the pilot to see a length of approach and/or touch down zone lights which would be covered in three seconds at landing approach speed when the aircraft is (1) on a two and a half degree glide slope, (2) at a decision height which places the lowest part of the aircraft at one hundred feet above the touch-down zone extending horizontally, (3) yawing to the left to compensate for ten knots crosswind, (4) loaded to the most critical weight and center of gravity, and (5) making the approach with a twelve hundred foot runway visual range."

In order to accomplish this, (1) the bottom edge of the pilot's field of view should be at least 29.7 degrees below the "design eye position" with respect to the aircraft's waterline plane, (2) the top edge of the pilot's field of view should be not more than eight degrees below the design eye position, and (3) the side edges of the pilot's field of view should be at least 12.7 degrees to the left and right of the design eye position. In the present description, the term "design eye position" defines a fixed spatial reference point in the airplane cockpit which is determined in a conventional manner. The aforementioned azimuth and elevations defining the minimum field of view are calculated in a conventional manner (assuming an airplane ground speed of 155 knots) using standard algebra and trigonometry and the aforementioned criteria set forth in AS 580B.

The dimensions of the instrument panel aperature 28, pressure bulkhead transparent window 38, and the fuselage opening 44 are then calculated in a conventional manner using the above azimuth and elevation calculations (relative to the design eye) and the respective known distances (a) between the design eye position and a typical commercial transport instrument panel (e.g., thirty two inches), (b) between the design eye position and the pressure bulkhead windows (e.g., forty inches), and (c) between the design eye position and the nose portion of the fuselage (e.g., twenty five feet).

In the present exemplary embodiment, this results in an instrument panel aperature 28 having a width dimension of about fifteen inches and a height dimension of about thirteen inches, a pressure bulkhead transparent window 38 having a width dimension of about twenty inches and a height dimension of about sixteen inches, and a nose portion opening 44 having a longitudinal dimension of about twenty feet and a lateral dimension of about two feet near the tip of the nose and having a maximum lateral dimension of about nine feet near the cockpit.

It should be appreciated that based on these dimensional requirements, it is necessary to have an airplane nose portion 22 which has a flat bottom and flat sides. That is, in order to obtain the required azimuth and elevation field of view, and because the canards must be flat, the fuselage adjacent to the side and bottom of the airplane nose portion where the canards cover the opening 44 must also be flat. Furthermore, because of the highly tapered nose (due to supersonic area ruling requirements) and the resulting configuration of the opening 44, the canards 26 must have a high aspect ratio. That is, the canards 26 must be long and thin. In addition, the canards 26 must be folded forward instead of rearward (as in conventional aircraft) to conform to the nose planform.

It should be appreciated that by using the viewing tunnel 40 in combination with the opening 44 as a viewing port, there is no need to provide a transparent window along the fuselage to cover the opening 44. This allows for a significant reduction in airplane weight due to the large fuselage opening required for an adequate field of view. In addition, because of the highly taped nose, covering the opening 44 along the fuselage with a transparent window would result in a certain amount of visual distortion due to the highly acute angles of viewing incidence from the cockpit.

What is claimed is:

1. In an aircraft having a cockpit, apparatus comprising:
   a. an aperature located in an instrument panel of the cockpit;
   b. a nose portion of the aircraft having an opening located between the aperature and a tip of the nose portion to permit a pilot in the cockpit to look simultaneously through the aperature and the opening to a location outside the aircraft; and
   c. a door, which is an aerodynamic lifting surface of the aircraft, is connected to the aircraft and is movable between (i) an open position where the opening is not covered and (ii) a closed position where the opening is covered and the door is aligned with an exterior surface of the nose portion.

2. The aircraft as set forth in claim 1 wherein:
   a. the aircraft includes a bulkhead located between the aperature and the opening to maintain a predetermined pressure in the aircraft; and
   b. the bulkhead includes a transparent window to permit the pilot to see from the cockpit through the opening.

3. The aircraft as set forth in claim 1 wherein:
   a. the aircraft includes an opening in a bottom surface and a side surface of the nose portion;
   b. the lifting surface includes a first portion and a second portion; and
   c. the aircraft includes means for moving the lifting surface to the stowed position such that the first portion covers the bottom surface opening and the second portion covers the side surface opening.

4. The apparatus as set forth in claim 3 wherein the lifting surface is a canard.

5. The aircraft as set forth in claim 4 wherein:
   a. the canard first portion is pivotally connected to the canard second portion; and
   b. the moving means includes means for moving the canard in a horizontal direction so that the canard first portion covers the bottom surface opening and for pivoting the canard second portion relative to the first portion so the canard second portion covers the side surface opening.

6. A method of looking outside an aircraft, the method comprising the steps of:
   a. moving a lifting surface connected to the aircraft from a closed position where an opening in a nose portion of the aircraft is covered and the lifting surface is aligned with an exterior surface of the nose portion to an open position where the opening is uncovered;
   b. looking through an aperature, from a cockpit of the aircraft, located in an cockpit instrument panel; and
   c. looking through the opening while simultaneously looking through the instrument panel aperature to see outside the aircraft.

7. In an aircraft, apparatus comprising:
   a. an aperature located in a interior panel of the aircraft;
   b. a nose portion of the aircraft having an opening located therein to permit a person in the aircraft to look simultaneously through the aperature and the opening to a location outside the aircraft; and
   c. a door, which is an aerodynamic lifting surface of the aircraft, connected to the aircraft and movable between (i) an open position where the opening is not covered and (ii) a closed position where the opening is covered by the door.

8. The aircraft as set forth in claim 7 wherein the door includes means for moving the door so that the door is aligned with an exterior surface of the nose portion in the closed position.

9. The aircraft as set forth in claim 8 wherein:
   a. the aircraft includes an opening in a bottom surface and a side surface of the nose portion;
   b. the door includes a first portion and a second portion; and
   c. the moving means includes means for moving the door to the closed position such that the door first portion covers the bottom surface opening and the door second portion covers the side surface opening.

* * * * *